Jan. 17, 1967 J. E. POPMA ETAL 3,298,671
COLORING AND MIXING PADDLE
Filed July 16, 1965

INVENTORS.
JEWETT EUGENE POPMA
VINCENT J. POPMA
BY
ATTORNEY

3,298,671
COLORING AND MIXING PADDLE

Jewett Eugene Popma, 19110 SW. Kantara Way, Lake Oswego, Oreg. 97034, and Vincent J. Popma, 4415 SE. Ogden St., Portland, Oreg. 97206
Filed July 16, 1965, Ser. No. 472,648
2 Claims. (Cl. 259—114)

This invention relates to the coloring of liquid material by adding a pigment or colorant to the material and mixing the same into the material through the medium of a specially equipped paddle.

More specifically, this invention relates to the coloring and mixing of paint, particularly white paint, in order to convert the paint into a paint of a desired predetermined color or definite shade of color.

A familiar problem, which is encountered, in the merchandising of paint, especially in small paint stores, hardware store, grocery stores, supermarkets and the like, is the fact that, in order to meet all possible requirements on the part of customers, it is necessary to carry a very large inventory on hand, in relation to sales volume, due to the many different colors of paint which may be demanded by the customers. An object of the invention is to meet this problem by providing simple practical and accurate means for coloring paint, specifically white paint, into any of a large range of colors and shades as required, so that only such means in addition to the white paint need be kept in stock. The means by which this object is effectively achieved comprises a special coloring and mixing paddle as hereinafter briefly described.

The specific object of the invention accordingly is to provide a novel and useful coloring and mixing paint paddle which will be easy, convenient and efficient for use on the part of the general public.

A related object is to provide a coloring and mixing paddle which will require only a small amount of display and storage space, and which will be relatively inexpensive in itself, and thus a paint coloring paddle which will be practical for the average distributor or retailer to maintain in substantial supply covering a wide range of desirable colors.

A further object is to provide an improved coloring and mixing paint paddle the use of which does not require any particular care or skill for producing the exact color or shade desired on the part of the customer.

The composition and construction of the improved coloring and mixing paddle embodying the present invention, and the manner in which it is employed, will be readily understood from the following brief description with reference to the accompanying drawings, in which drawings.

The paddle comprises an elongated, preferably, although not necessarily, flat main member 10 having a length considerably greater than the depth of the can of paint for which the paddle is to be used.

A sealed envelope 11 of thin, flexible but suitably strong material, preferably plastic, containing a predetermined amount of proper colorant 12, in either liquid or pulverized form, is attached to the main member 10 near the bottom end as shown.

Figure 1:
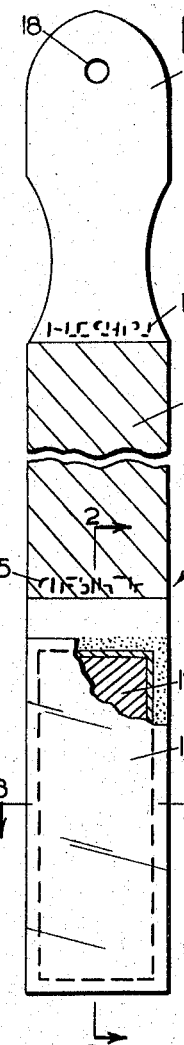
FIGURE 1 is a foreshortened front elevation of the coloring and mixing paddle.
Figure 2:
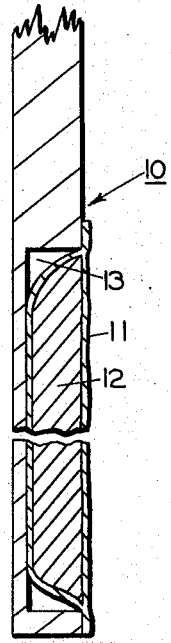
FIGURE 2 is a fragmentary section on line 2—2 of FIGURE 1 drawn to a larger scale.
Figure 3:
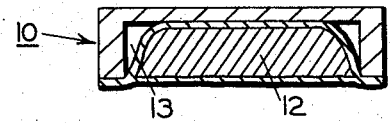
FIGURE 3 is a fragmentary section on line 3—3 of FIGURE 1 drawn to the same scale as FIGURE 2.

Preferably the main member 10 is formed with a recess or cavity 13 near the bottom end, as shown in FIGURES 1, 2 and 3, the recess being of the proper size to receive the envelope 11 containing the colorant, the envelope being secured in place by the application of adhesive to the border area of the the envelope so as to secure the envelope border to the rim about the cavity 13.

An area 14 on the face of the main member 10 is painted in exactly the same color as will be obtained when the colorant 12 in the envelope 11 is mixed with a specified amount of white paint. The name of the particular color, and preferably also a special number given to that color, are printed on the face of the main member 10 for example as indicated at 15 in FIGURE 1. Also on the face of the main member 10, for example as indicated at 16 in FIGURE 1, is stated the amount of paint (thus one quart, one-half gallon, etc.) for which the particular paddle with the particular amount of colorant is to be used. The paddles consequently are made in different sizes with different size envelopes and thus with different amounts of colorant to correspond to the amount of paint for which each paddle and its colorant is intended to be used.

The top end of the main member 10 is shaped into a handle 17 for convenience in use, and also preferably has an aperture 18 to enable the paddle to be hung up on a nail in a display case. As will be evident, these paddles require very little space not only for storage but also for public display.

When the paddle is to be used, the can of paint of the right size is opened and, with the proper paddle selected, the user slips the colorant envelope 11 open with a knife while holding the paddle above the opened paint can and then places the paddle down in the paint and uses the paddle to mix the colorant into the paint. When the colorant has been thoroughly mixed into the paint, provided the amount of the paint is the same as that specified on the paddle, the color of the paint will exactly match the color on the area 14 of the paddle.

Figure 5:
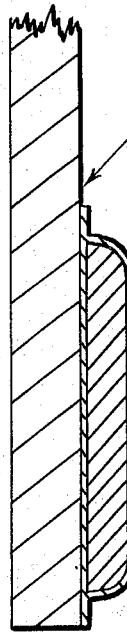
FIGURE 5 is a fragmentary sectional elevation, similar to FIGURE 2 and drawn to the same scale as FIGURE 2, but showing a slightly modified manner in which the paddle may optionally be made.
Figure 4:
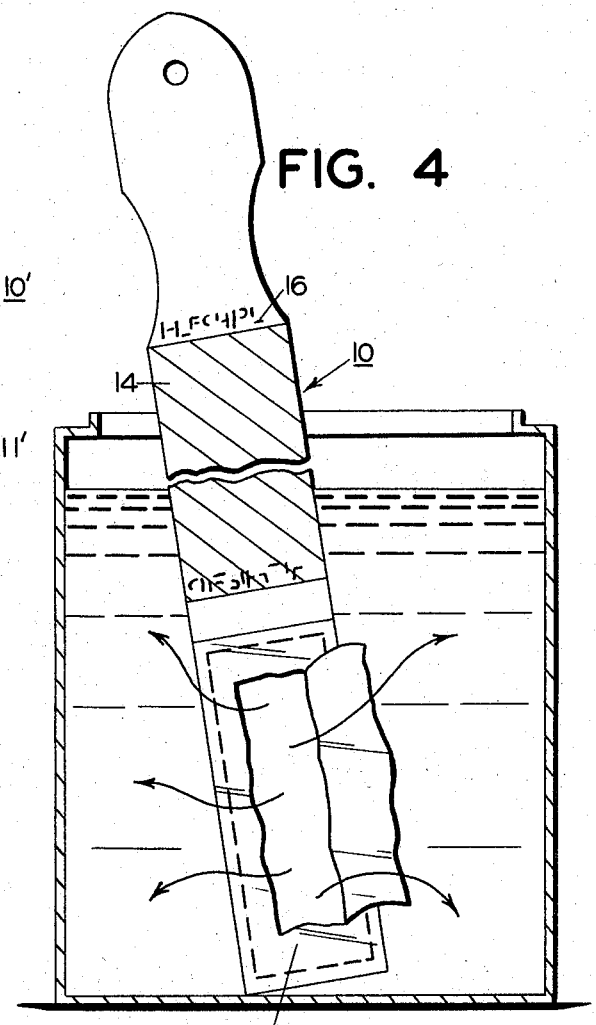
FIGURE 4 is a sectional elevation of an open paint can showing the paddle of FIGURE 1 being used in the same.

In the modification shown in FIGURE 5, the main member 10' of the paddle is formed without any bottom recess and the envelope 11' is secured by adhesive to the face of the paddle in the same relative location as shown. In all other respects the paddle is the same as previously described.

We claim:

1. A pigment dispenser and mixer for use in coloring paint to a particular color, said dispenser and mixer comprising a flat, elongated, paddle-type main member having a length considerably greater than the height of the container for the paint, a sealed envelope of thin flexible waterproof material carrying a predetermined amount of pigment of a specified color, the width of said envelope not exceeding the width of said main member, said envelope secured to the face of said main member, an area on said face of said main member above said pigment envelope painted with the exact color which will be produced by the mixing of said pigment with the particular quantity of paint intended to be colored, indicia on said main member designating the color in said area, and seperate indicia on said main member specifying the exact quantity of paint for which the pigment carried on said main member is intended for use.

2. A pigment dispenser and mixer for use in changing white paint to a particular desired color, said dispenser and mixer consisting of a flat, elongated, paddle-type main member having a length considerably greater than the height of the container for the paint and terminating at the top in a handle-shaped portion, a recess formed in the face of said main member near the bottom, a predetermined amount of pigment of a specified color in said recess, a sealed covering of thin flexible plastic over said pigment, said covering secured to said main member, an area on said face of said main member above said recess painted with the exact color which will be produced by the mixing of said pigment with the particular quantity of paint intended to be colored, indicia on said face of said main member designating the color in said area, and seperate indicia on said face of said main member specifying the exact quantity of white paint for which the pigment carried on said main member is intended for use.

References Cited by the Examiner

UNITED STATES PATENTS

| | | | |
|---|---|---|---|
| 2,526,863 | 10/1950 | Gilliam | 259—144 |
| 2,608,861 | 9/1952 | Knipper | 73—343 |
| 2,819,738 | 1/1958 | Marberg | 141—1 |
| 3,107,085 | 10/1963 | Lerner | 259—144 |

WALTER A. SCHEEL, *Primary Examiner.*

WILLIAM PRICE, *Examiner.*